R. S. BARNUM,

Assignor to H. C. GOODRICH.

Hinged-Slate.

No. 8,936. Reissued Oct. 21, 1879.

*Witnesses:*

Donn P. Turtchell

William W. Dodge.

*Inventor:*

R. S. Barnum.

Assr. to H. C. Goodrich

By Dodger & Son

Attys.

N. PETERS, PHOTO-LITHOGRAPHER, WASHINGTON, D. C.

UNITED STATES PATENT OFFICE.

RUSSEL S. BARNUM, OF CHICAGO, ILL., ASSIGNOR TO HARRY C. GOODRICH.

IMPROVEMENT IN HINGED SLATES.

Specification forming part of Letters Patent No. 188,840, dated March 27, 1877; Reissue No. 8,936, dated October 21, 1879; application filed July 29, 1879.

*To all whom it may concern:*

Be it known that I, RUSSEL S. BARNUM, of Chicago, in the county of Cook and State of Illinois, have invented certain new and useful Improvements in Hinged Slates; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1:
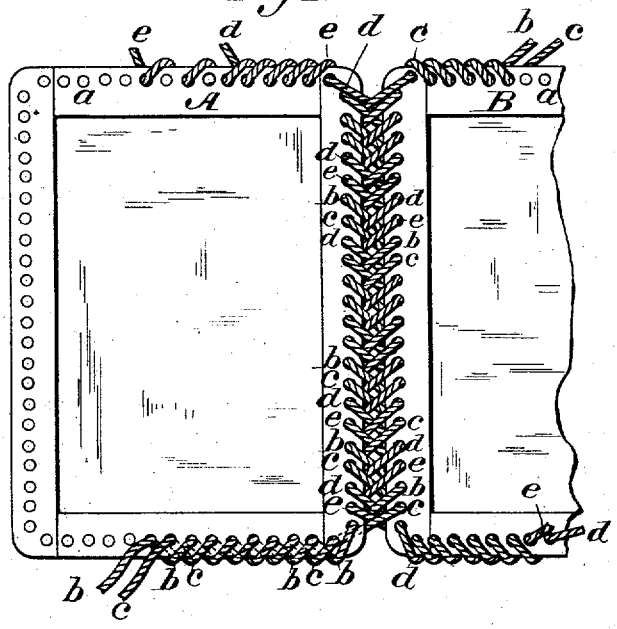
Figure 2:
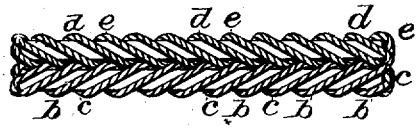

Figure 1 is a plan view, representing the two slates open; Fig. 2, an end view, showing the two slates closed.

The object of this invention is to provide a double slate—the two slates hinged together in a simple manner, so as to permit them to fold inward in either direction; and this I accomplish by interlacing cords through and along the back of the slates. These same cords may form a muffling material on the hinged sides, and, if extended, will form a muffling around the entire frame.

My invention relates to the application of the cord as a hinge in the manner stated, and does not cover the use of the cord as a muffler alone, the same being the invention of H. C. Goodrich.

In the drawings, A B represent the frames of two ordinary slates, each provided with a series of holes, *a*, near the outer edge, to receive cords which form the muffling material. In the frame A are two cords, *b c*, which are passed through the holes *a* and wound over the edge of the frame. In the frame B are two other cords, *d e*. Along the back of the double slate the two cords *b c* cross over between the frames from one frame to the other, and are interlaced with the cords *d e*, which also, along the back of the two slates, pass over from one slate to the other, as represented in Fig. 1. As shown, the two cords *b c* are carried, at the upper ends of the two slates, over into the holes in the frame B, while the other two cords, *d e*, are carried over into the top of the frame A. This interlacing of these four cords along the back of the two slates forms a very efficient hinge, which permits the folding of the two slates together either way, and the arrangement of the cords is such that, in use, they fold down between each other, and do not, along the back of the slate, rub against each other so as to wear them away. The ends of the cords are fastened by driving pins *g* into the holes.

In using the slates it is not necessary to open them to get the writing or figures where the same can be protected. The slates can be closed together, and, having been used in that position, can be reversed, bringing the writing or figures upon the inside.

Having thus described my invention, what I claim is—

1. In a double slate, the frames A B, provided with muffling-cords, so arranged that they cross from one frame to the other at the back, and form a hinge, to permit the frames to turn in either way, substantially as described.

2. As a new article of manufacture, a double slate, consisting of two single slates provided with perforated frames, and connected by means of cords passed through and between the frames, substantially as described and shown.

3. The two perforated slate-frames, in combination with the connecting-cords passed through and between the edges of the frames, and arranged to fold down between each other, as described and shown, whereby the frames are permitted to fold closely together.

4. The two perforated frames, in combination with a plurality of cords passed through and between the frames, in the peculiar manner shown and described.

RUSSEL S. BARNUM.

Witnesses:

F. M. ADAMS,

D. C. HARBAUGH.